No. 894,508. PATENTED JULY 28, 1908.
R. K. LE BLOND & W. F. GROENE.
MILLING MACHINE.
APPLICATION FILED JULY 10, 1907.

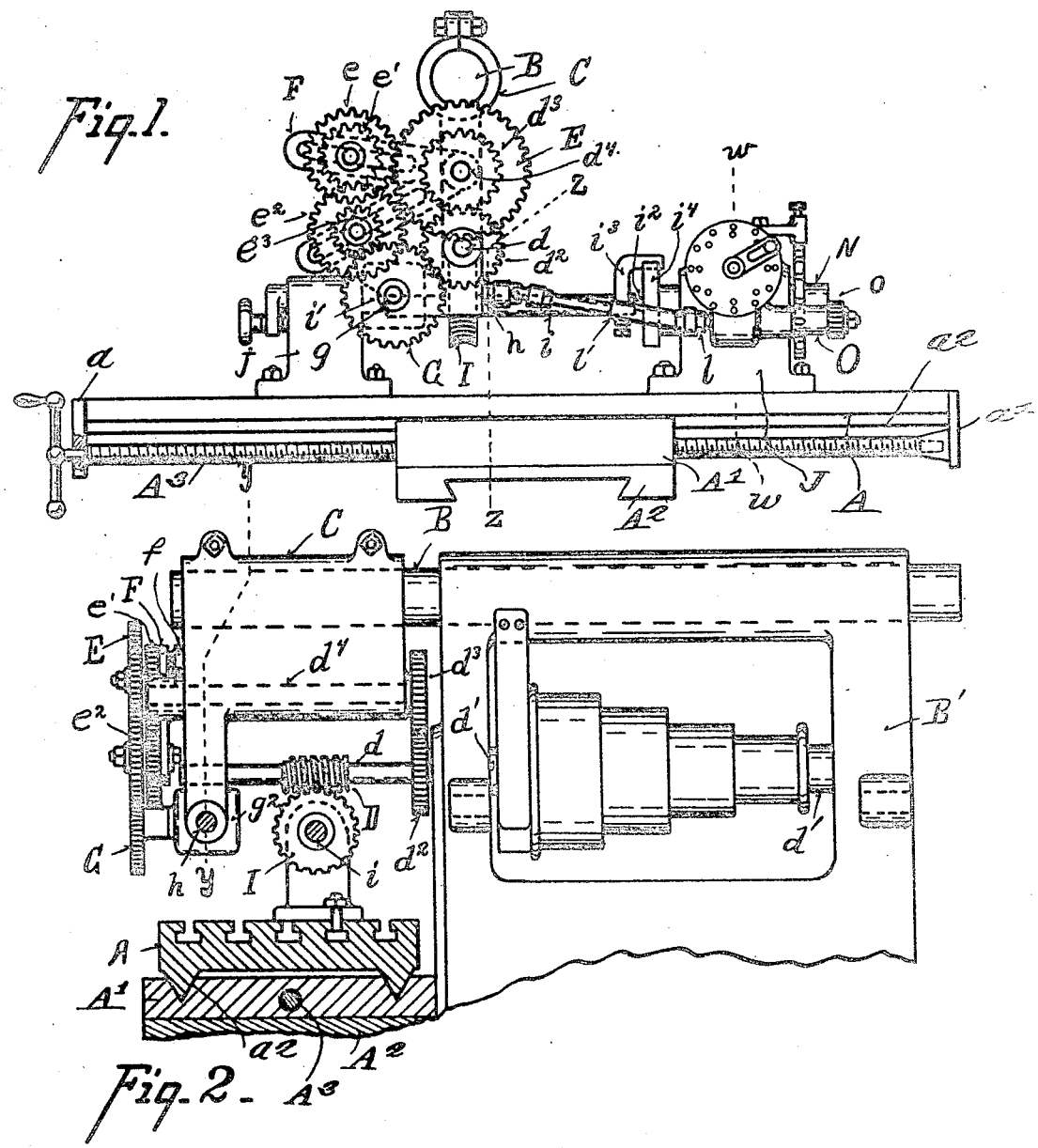

2 SHEETS—SHEET 2.

WITNESSES:
C. W. Miles.
A. McCormack.

INVENTORS
Richard K. Le Blond
William F. Groene
BY
Walter F. Murray
ATTORNEY.

UNITED STATES PATENT O[FFICE]

RICHARD K. LE BLOND AND WILLIAM F. GROENE, OF CINCINNATI, OHIO, ASS[IGNORS TO] R. K. LE BLOND MACHINE TOOL COMPANY, OF CINCINNATI, OHIO, A CO[RPORATION OF] OHIO.

MILLING-MACHINE.

No. 894,508.  Specification of Letters Patent.  Patented Ju[ly ...]

Application filed July 10, 1907. Serial No. 383,070.

*To all whom it may concern:*

Be it known that we, RICHARD K. LE BLOND and WILLIAM F. GROENE, both citizens of the United States of America, and residents of Cincinnati, county of Hamilton, State of Ohio, have invented certain new and useful Improvements in Milling-Machines, of which the following is a specification.

Our invention relates to improvements in milling machines. One of its objects is to provide an attachment for milling machines whereby worm-wheels, spur-gears, spiral-gears, and the like, may be hobbed or cut while the work is rotated.

Another object is to provide ready means for effecting the various changes in speed of the operative parts to enable a wide range of work to be operated upon.

Another object is to provide attachments which may be readily put in place and detached as required.

Figure 3:
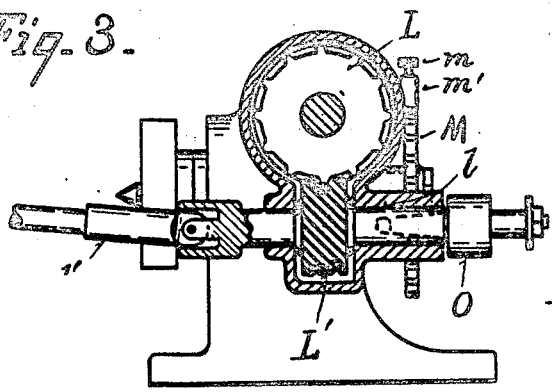
Figure 4:
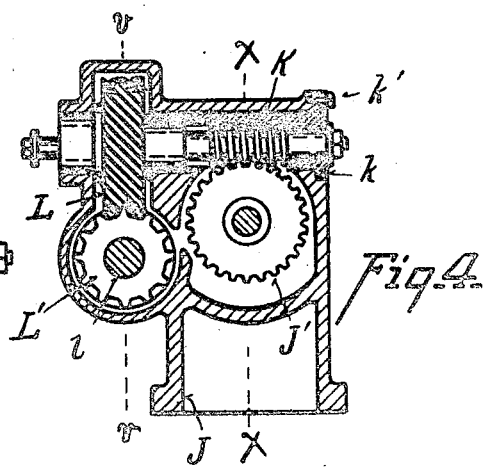
Figure 5:
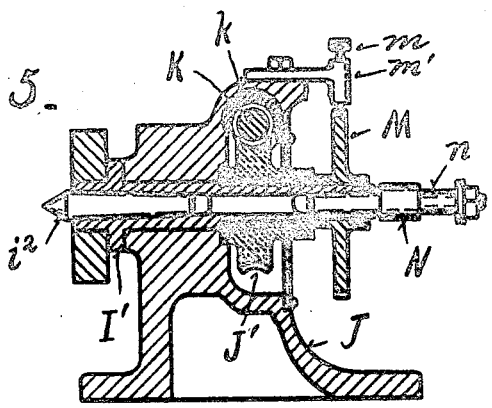
Figure 6:
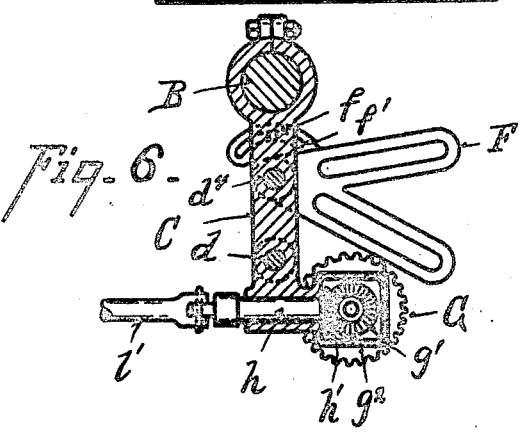

It further consists in certain details of form, combination and arrangement, all of which will be more fully set forth in the description of the accompanying drawings, in which, Figure 1 is a front elevation of the bedplate of a milling machine with our attachment in place. Fig. 2 is a side elevation of a milling machine partly in section on line $z$—$z$ of Fig. 1. Fig. 3 is a section through the work cutting head on line $v$—$v$ of Fig. 4. Fig. 4 is a section through the same on line $w$—$w$ of Fig. 1. Fig. 5 is a section through the same on line $x$—$x$ of Fig. 4. Fig. 6 is a section on line $y$—$y$ of Fig. 2.

In the accompanying drawings, A, represents the table or traveling carriage of the milling machine.

A', represents the swivel base of the table, and $A^2$, represents the saddle. Through the swivel base, A', feed screw, $A^3$, passes, the ends of the screw being fixed against longitudinal movement in the ends, $a$, $a'$, of the table, so that by the rotation of the screw, $A^3$, the table is reciprocated in the ways, $a^2$, formed in the swivel base, A'.

B represents the overhanging arm projecting from column, B', and from which is rigidly suspended the frame, C.

The pa[rt ...]

the teeth of the gears are to be [cut is] carried upon a mandrel, $d$, and [journaled at] one end to the spindle, $d'$, of the [ma]chine and at the opposite end jou[rnaled in the] frame C.

$d^2$, represents a gear carried by the [shaft,] $d$, which drives a gear, $d^3$, on the [shaft,] journaled in the frame, C. E, re[presents a] gear at the opposite end of the [shaft] which meshes with a gear, $e$, car[ried by an] adjustable bracket, F. Bracket [turns] upon the shaft, $d^4$, and may be su[itably] clamped to any desired position, b[y means] of a bolt, $f$, passing through a se[gmental] slot, $f'$.

A train of gears, $e'$, $e^2$, $e^3$, which [may be] varied by substituting suitable cha[nge gears] transmits the desired number of rev[olutions] to the gear, G, mounted upon the s[haft] which rotates shaft, $h$, through beve[l gears] $g'$, $h'$, carried in the housing, $g^2$, formin[g part] of the frame, C.

The gear blank, I, or work to be ho[bbed,] is mounted upon a mandrel, $i$, which is [sup]ported between the tail-stock cente[r, or] stationary center, $i'$, and a rotating ce[nter] $i^2$, carried by the spindle, I', of the trav[eling] or dividing head. The mandrel, $i$, is [pro]vided with a dog, $i^3$, which engages [a] chuck, or face plate, $i^4$, to transmit m[otion] to the mandrel, $i$. The blank or wor[k to] be hobbed might be held upon the [the] spindle, I', by any of the well known mea[ns] such as by chuck, instead of being mount[ed] between the tail stock and the spindle.

J, represents the frame of the traveli[ng] head, which is bolted to the carriage. The stationary center, $i'$, is carried in frame, $j$, which is likewise bolted to the ca[r]riage, A. Mounted on the spindle, I', is a worm-wheel, J', which receives motion from a worm, K, which is mounted in an eccentri[c] sleeve, $k$, journaled in the frame, J, so t[hat] by rotating the sleeve, $k$, the worm may [be] disengaged from the worm-wheel, J', [if] desired.

$k'$, represents a bolt passing through [a] segmental slot to lock the sleeve, $k$, in i[ts] engaged or disengaged position.

Mounted on the shaft of the worm, K, is [a] spiral gear, L, which meshes with and [...]

flexible shaft connecting the secondary shaft and the rotatory shaft journaled in the column.

2. A milling machine having a column with an over-hanging arm, a main spindle, a table, a means for feeding the table and a dividing head carried by the table in combination with a frame secured to the over-hanging arm, a mandrel journaled between the over-hanging arm and the column, means of coupling the mandrel to the main spindle, a hob secured upon the mandrel, a rotatory shaft journaled in the frame, change gears carried by the frame and connecting the mandrel and the rotatory shaft, a second mandrel to be mounted between the tail stock and the spindle of the dividing head and adapted to hold the gear blanks against the hob, a secondary shaft mounted upon the table adjacent to the spindle of the dividing head, gears connecting the secondary shaft and the spindle of the dividing head, a flexible shaft connecting the secondary shaft and the rotatory shaft carried by the frame.

3. A milling machine having a column, a main spindle, a table, a means for feeding the table, a dividing head and a tail stock carried by the table in combination with a mandrel secured to the main spindle and adapted to carry a hob, a rotatory shaft, journal-bearings carried by the column in which said shaft is journaled, change gears between the mandrel and the shaft, a second mandrel to be carried between the tail-stock and the spindle of the cutting head and adapted to hold gear blanks against the hob, a secondary shaft journaled in the cutting head adjacent to the spindle of the dividing head, means for connecting and disconnecting the secondary shaft with the spindle of the dividing head, and a flexible shaft connecting the secondary shaft and the rotatory shaft carried by the column.

4. A milling machine having a column, a main spindle, a table, a means for feeding the table, a tail stock and a dividing head in combination with a mandrel secured to the main spindle and adapted to carry a hob, a rotatory shaft, journal bearings carried by the column in which said shaft is journaled, change gears between the mandrel and the shaft, a second mandrel to be carried between the tail-stock and the spindle of the dividing head and adapted to hold gear blanks against the hob, a secondary shaft journaled in the dividing head adjacent to the spindle of the dividing head, a worm-gear carried by cam bearings in the dividing head adjacent to the secondary shaft and the spindle of the dividing head for connecting and disconnecting the and a flexible shaft connecting the shaft car-table, a dividing head and a tail stock in combination with the hob holding mandrel, a rotatory shaft and gear wheels connecting the mandrel and the shaft, the shaft, mandrel and gear wheels being carried by the column, a mandrel adapted to hold the gear blank and mounted between the tail stock and the spindle of the dividing head, a secondary shaft mounted in the dividing head, a flexible shaft coupling the secondary shaft and the rotatory shaft in the column, a worm gear mounted in the dividing head, means for shifting the said worm gear for coupling and uncoupling the secondary shaft and the spindle of the dividing head, the secondary shaft and the spindle of the dividing head being adapted to receive pinions for putting them in gear with each other when the worm wheel is shifted to disconnect them.

6. A milling machine having a column, a main spindle and a table supported by the column, a dividing head mounted upon the table and a means for feeding the table, in combination with a hob-holding mandrel mounted in the column and in gear with the main spindle, means for mounting a gear blank upon the spindle of the dividing head, change gears, means for connecting the change gears with the hob-holding and the spindle of the dividing hea( disconnecting the change gears from t holding mandrel and the spindle of th ing head, said last named means bei pendent of the table feed, whereby t tive speeds of the hob-holding mand the spindle of the dividing head i varied irrespective of the movements table.

7. A milling machine having a colu table, a dividing head, a main spind combination with change gears mou upon the column, said change gears b gear with the main spindle, a flexible tory shaft in gear with the change gear in gear with the spindle of the dividing a means of disconnecting the spindle o dividing head from the flexible shaft means of feeding the table at the d speed irrespective of the speed of the of the dividing head.

RICHARD K. LE BLO
    WILLIAM F. GROENE.

Witnesses:
 WALTER F. MURRAY.
 AGNES MCCORMACK.